W Manning.

Mower.

6539X

Patented May 3. 1831

References.

Figure 1:
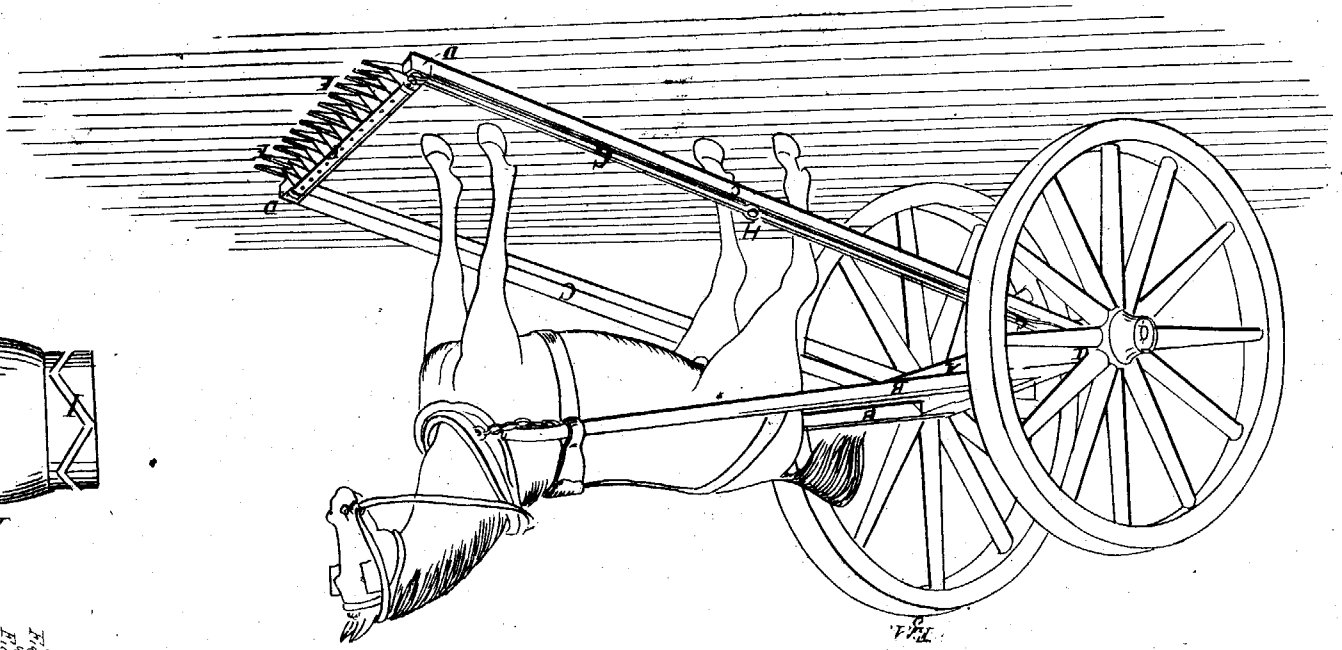

Fig. 1. Perspective view of Machine.

Figure 2:
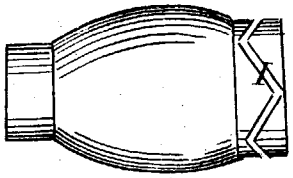

Fig. 2. Hub of wheel showing groove I

A, Axle tree. B: shafts C, axes. D, cross bars.

E, teeth F, cutters. G, lever. H, pin. I, zig zag groove.

6539X

United States Patent Office.

WILLIAM MANNING, OF PLAINFIELD, NEW JERSEY.

IMPROVEMENT IN GRASS AND GRAIN CUTTING MACHINES.

Specification forming part of Letters Patent dated May 3, 1831

*To all whom it may concern:*

Be it known that I, WILLIAM MANNING, of Plainfield, New Jersey, have invented an Improved Machine for Cutting Grass and Grain; and I do hereby declare that the following is a full and exact description of the construction thereof.

I provide an axle-tree with two wheels of the common construction. To this axle-tree I attach shafts, by which a horse is to draw the machine. From the axle-tree extend two arms in the direction of the shaft. These arms are mortised into or otherwise attached to the axle-tree. They are of greater length than the shafts, extending beyond them a sufficient distance for the cutting apparatus to be entirely clear of the horse. The two arms are united together by a cross-bar at their extreme ends, which cross-bar, when the machine is in action, rests and slides forward on the ground. Teeth of six or eight inches in length, more or less, are set like rake-teeth, standing forward on the cross-bar. These are made slender and for the purpose of holding the grass or grain to be cut. The cutters stand immediately above the teeth and receive a traversing motion in a way to be presently described. A flat bar of iron lies along upon the cross-bar, and the cutters are to be attached to this upper bar. The cutters are spear-shaped and are sharpened on each of their edges. They may vary in their length and width; but ordinarily they may be about six inches long and three or four wide at their bases. The grass or grain, which is held up by the teeth, passes between these knives or cutters. To give a traversing motion to them a lever may extend from the inner end of the hub of one or both of the wheels to the cutter-bar. This lever may work upon a pin at or near its center. A zigzag groove in the hub or in a wheel attached to it will give it a vibratory motion, and its connection with the cutter-bar at the opposite end will cause that to traverse. I intend sometimes to make the cutters revolve instead of traversing. They are then to be fixed upon the periphery of a wheel, the teeth being placed upon a fixed semicircle. The cutters will then have one sharp edge only. The wheel may be made to revolve by bands or gearing from one of the main wheels in various ways. When the machine is small it may be moved by the power of a man. The shafts may be fixed forward of the cutters and the general arrangement be varied without altering the main principle of my machine.

What I claim as my invention, and for which I ask Letters Patent, is—

The combined action of the teeth and cutters, whether the cutters are moved in a traversing or revolving direction.

WILLIAM MANNING.

Witnesses:
THOS. P. JONES,
JAS. ANDREWS.